UNITED STATES PATENT OFFICE.

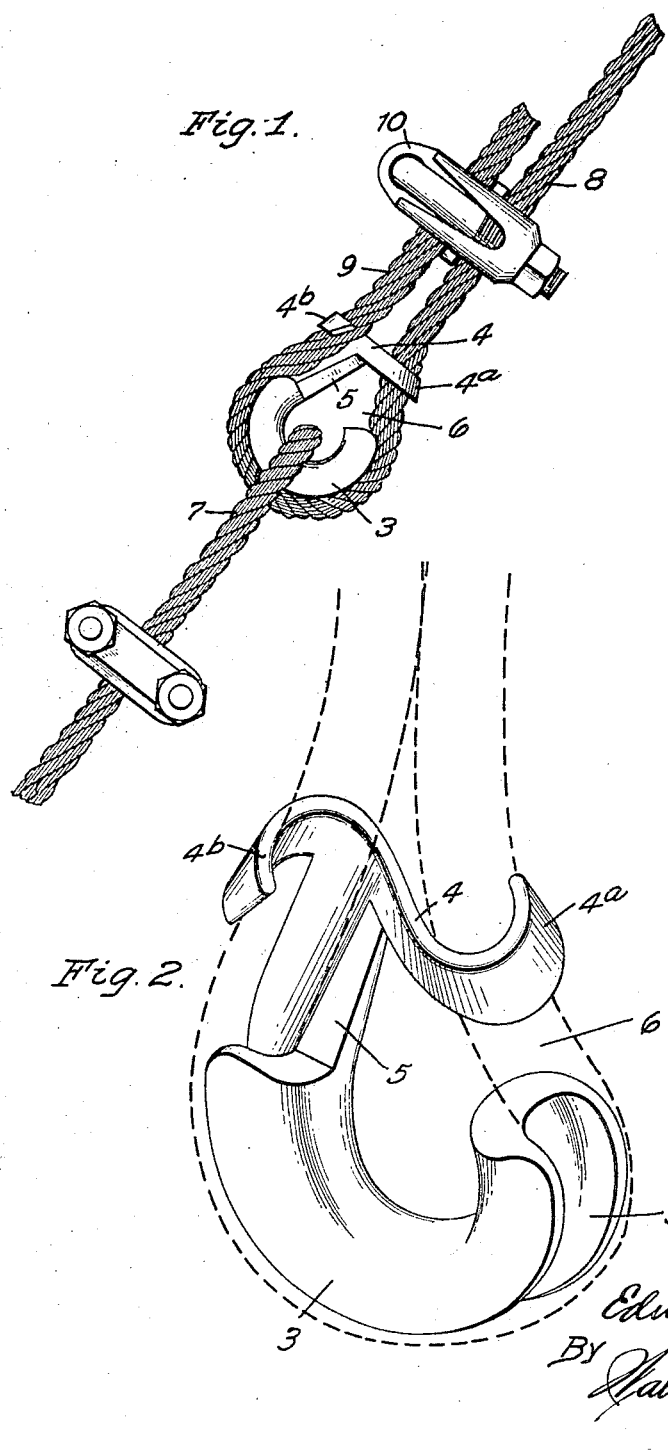

EDWARD O. KEATOR, OF DAYTON, OHIO.

ROPE AND CABLE THIMBLE.

1,288,021.     Specification of Letters Patent.     Patented Dec. 17, 1918.

Application filed October 30, 1918. Serial No. 260,390.

*To all whom it may concern:*

Be it known that I, EDWARD O. KEATOR, a citizen of the United States of America, and resident of Dayton, in the county of Montgomery and State of Ohio, have invented a new and useful Improvement in Rope and Cable Thimbles, of which the following is a specification.

An object of my invention is to produce an improved thimble for ropes and cables in which the ends of the cable which passes around it are brought and held together upon placing the rope or cable around the thimble, so that securing clips may be easily placed in position thereon.

A further object is to produce an improved rope or cable clip, which, in the operation of tightening the cable passing around it, will be held against displacement, and the rope passing around it will be permitted to slide freely in the tightening operation.

These and other objects are attained in the thimble described in the following specification and illustrated in the accompanying drawing in which;

Figure 1 is a fragmental elevation of a derrick guy rope having a thimble embodying my invention in position therein.

Fig. 2 is a perspective view of my improved thimble.

My thimble consists of a semi-circular grooved portion —3— having a double hook —4— attached thereto by means of a neck —5— extending from one end of the grooved portion, the opposite end of the grooved portion being spaced from the hook —4— to form a space —6— through which the ropes to be held therein may be passed.

In securing my improved thimble in position upon a rope —8— which has to be looped to form an eye, the thimble is first hooked into the eye of an anchor —7—. The end of the rope to carry the thimble is then passed around the thimble in the following manner. The rope is first engaged with hook —4ª— of double hook —4—, it is then passed around portion —3— of the thimble and through the eye —7—, being placed into groove —3ª— in passing around the thimble. Having been passed around portion —3—, the end is laid in hook —4ᵇ— of the double hook —4—, the end —9— being brought parallel with and into engagement with the main portion of the rope —8—. A block and tackle, turnbuckle or other stretching device is then attached to end —9— and to rope —8— above end —9—. The rope is now stretched or tightened, the conformation of my thimble permitting easy sliding of the rope therethrough without displacement. As soon as sufficiently tight, one or more clips —10— are placed upon the parallel portions of the rope as shown in Fig. 1 to hold it in tightened condition.

Having thus described my invention, what I claim is:—

1. A rope or cable thimble consisting of a substantially semi-circular grooved portion, and a hook adapted to retain the branches of a rope located in the thimble in engagement with one another and extending from one end of the semi-circular portion.

2. A rope or cable thimble consisting of a substantially semi-circular portion having a groove formed in the outer periphery thereof, an S shaped hook located above the semi-circular portion, and a neck connecting the hook and semi-circular portion at one end of the semi-circular portion, supporting the hook above the semi-circular portion, in spaced relation to the opposite end of the semi-circular portion and with the ends of the hook in alinement with the ends of the groove, whereby each end of the hook will retain a rope or cable in its adjacent end of the groove of the semi-circular member.

In testimony whereof, I have hereunto subscribed my name this 23 day of Sept., 1918.

EDWARD O. KEATOR.

Witnesses:
   ORION E. BOWMAN,
   DELLA M. BOWMAN.

Copies of this patent may be obtained for five cents each, by addressing the "Commissioner of Patents. Washington, D. C."